Patented Jan. 12, 1943

2,307,960

UNITED STATES PATENT OFFICE 2,307,960

TOOL ALLOYS

Charles J. Schafer, Baltimore, Md.

No Drawing. Application May 13, 1941,
Serial No. 393,262

8 Claims. (Cl. 75—123)

This invention relates to alloys and has for its object the provision of new zirconium and columbium containing alloys of great hardness, strength and durability, and especially adapted for use in the making of high speed cutting tools for machine shop practices as well as finer cutting instruments and blades of many types, including those for surgical and dental use. The alloys are also useful in making other tools such as twist drills, saws, files, wrenches, shears, and the like.

Another object of the invention is the provision of novel processes of preparing the alloys, including certain preliminary reduction methods for obtaining the zirconium and columbium for use in the main melt wherein these elements are combined with the iron and other optional ingredients.

My novel alloys may be used to great advantage in place of many of the alloy and carbon steels, but without the necessity of tempering the products except in very special cases involving the more intricately formed tools such as certain twist drills, threading dies and some similar tools, which have to be forged or drawn into shape and then completed by hardening. The novel alloys are subject to some variation in their iron content depending upon the desired resistance to the action of acids or to tarnishing, for example due to the sterilizing medium which may be used. The alloys are generally non-corrosive and non-tarnishing and resistant to many acids, and they may be welded, forged, swaged, heated, and reheated with a minimum of loss.

The chief constituents of the new alloys are zirconium and columbium, the latter being combined with a certain amount of tantalum which occurs in the same ores and which it is not necessary to eliminate, since it lends certain desirable qualities to the alloy. I have found that the novel alloy is superior in properties, including its hardness and tensile strength to the tungsten, molybdenum, vanadium, nickel, and chrome steels which are now in widespread use.

The alloys may be produced in bar stock or cast in the ultimate form of tool or other product in which it is to be used. Unlike certain prior products they are not made from sintered or granular materials compacted under pressure, such as for example tungsten-carbide, and the alloy may comprise the entire tool instead of made as a tip for a steel shank as in the case of certain other cutting products.

The general range of percentages of the various elements comprising the group of alloys provided by the present invention may be set forth as follows:

| | |
|---|---|
| Zirconium | From 5% to 40% |
| Columbium | From 1% to 20% |
| Tantalum | From 1% to 8% |
| Titanium | From none to 15% |
| Tungsten | From none to 25% |
| Iron | Balance |

Conveniently, the columbium and the tantalum are introduced in combination since they are obtained from the same ores in the pre-melt or reduction step, as will be more clearly understood as the specification proceeds.

As indicated, the titanium and tungsten may be omitted in the preparation of alloys for certain purposes.

There will now be set forth various optional formulas for specific alloys within the purview of the invention and an indication of the general uses to which they are adapted.

For a cutting tool for general use or for the preparation of a bar stock for the making of tools, the following two formulas may be employed. The first will yield a stock having a hardness of 75 on the Rockwell-C scale, and the second will have a hardness of 65 on the same scale.

Hardness 75

| | Per cent |
|---|---|
| Zirconium | About 30 |
| Columbium | About 12 |
| Tantalum | About 2.5 |
| Titanium | About 7.5 |
| Iron | About 48 |

Hardness 65

| | Per cent |
|---|---|
| Zirconium | About 35 |
| Columbium | About 14 |
| Tantalum | About 3 |
| Iron | About 48 |

For the production of bar stock of greater hardness than those set forth above, the percentage of titanium may be proportionately increased up to about 15%.

When tungsten is used in the preparation of the basic bar stock it is suggested that it be employed in the amounts from 15% to 25%, the titanium being then reduced to about 3%, the columbium and tantalum reduced by about one-half, and the balance subtracted from the iron content. This will yield an alloy of the following approximate composition:

| | Per cent |
|---|---|
| Zirconium | 30 |
| Columbium | 6 |
| Tantalum | 1.5 |
| Titanium | 3 |
| Tungsten | 15–25 |
| Iron | Balance |

Other formulas within the scope of the invention and suggested uses are set forth below:

Cutting blades

| High grade | | Low grade | |
|---|---|---|---|
| | Per cent | | Per cent |
| Zirconium | 20 | Zirconium | 25 |
| Columbium | 8 | Columbium | 3 |
| Tantalum | 1.5 | Tantalum | 0.5 |
| Titanium | 3 | Iron | Balance |
| Iron | 67.5 | | |

Drawing and cutting dies

| High grade | | Low grade | |
|---|---|---|---|
| | Per cent | | Per cent |
| Zirconium | 30 | Zirconium | 30 |
| Columbium | 15 | Columbium | 8 |
| Tantalum | 4 | Tantalum | 2 |
| Tungsten | 8 | Titanium | 5 |
| Iron | 43 | Iron | 55 |

Surgical and dental instruments

| | High grade | Medium grade | Low grade |
|---|---|---|---|
| | Per cent | Per cent | Per cent |
| Zirconium | 40 | 40 | 20 |
| Columbium | 14 | 20 | 10 |
| Tantalum | 4 | 5 | 2 |
| Titanium | 7 | 10 | 7 |
| Iron | 35 | 25 | 61 |

For the making of twist drills, it is preferred to use from 5% to 10% of one of the bar stock alloys first described and add it to steel in the furnace. The resultant alloy steel will then be forged and completed and finally hardened as described hereinafter. An alternative way of making the twist drill alloy is to use about 5% zirconium, 1% columbium (with the included tantalum) and 1% titanium, the balance being iron. For use in making saws, files, and other special cutters of intricate form which must be completed before hardening and which cannot conveniently be cast in the final form from the origianl bar stock alloy, it is preferred to use from 5% to 20% of the bar stock alloy previously disclosed under the scale of hardness 75 Rockwell-C.

Magnetic and non-magnetic alloys of this general nature may be produced according to the following formulas, the aluminum and yttrium being substituted for a portion of the iron in the respective cases.

| Magnetic alloy | | Non-magnetic alloy | |
|---|---|---|---|
| | Per cent | | Per cent |
| Zirconium | 25 | Zirconium | 15 |
| Columbium | 6 | Columbium | 6 |
| Tantalum | 1 | Tantalum | 1 |
| Aluminium | 15 | Yttrium | 5–10 |
| Iron | 53 | Iron | Balance |

Besides the most appropiate use of the alloy in the production of cutting tools and other instruments such as have been described, the alloy may also be employed in the production of sheet material of great strength and durability and it may be employed in maritime construction particularly on account of its non-corrosive properties. One suggested formula for an alloy for use in the making of ship hull, deck, and housing plates is as follows:

| | Per cent |
|---|---|
| Zirconium | 20 –30 |
| Columbium | 4 –14 |
| Tantalum | 0.5– 3 |
| Iron | 74.5–53 |

For the production of relatively thin commercial sheet material such as used for making stampings and drawn shapes for hotel and restaurant ware, the following three formulas are suggested.

| | Percent | Percent | Percent |
|---|---|---|---|
| Zirconium | 40 | 30 | 30 |
| Columbium | 14 | 10 | 10 |
| Tantalum | 4 | 4 | 3 |
| Titanium | 3 | 7 | 4 |
| Aluminium | | | 8 |
| Iron | 39 | 49 | 55 |

In producing these alloys the zirconium and the columbium and tantalum ingedients are reduced directly from their ores and preferably in the same type of electric arc furnace in which the main melt is made. The furnace is preferably provided with a special lining of refractory material of somewhat similar content to the ingredients employed in producing the alloy. The minerals or ores used in the lining are ground to about 200 mesh. These include about 70%–80% of crude zircon, about 15%–20% diatomaceous earth and the balance quartz, using dextrine as a binder. The lining is formed into the desired shape under hydraulic pressure so as to obtain extreme hardness and density. The lining is then baked in an electrically heated oven at about 250° F. for about twenty-four hours, for the larger size furnaces, and a correspondingly less time for smaller furnaces. The furnace linings may be surface-glazed and gradually cooled to room temperature. The same material and processes may be employed in making molds for the casting of the alloys from the furnace.

In producing the ferro-zirconium for use in the alloy there is charged into the furnace equal quantities of iron and baddeleyite which have been intimately mixed with from 20% to 30% of cryolite. The furnace is then sealed and the arcs placed in position. The current is applied starting at about 250 amps. and gradually increasing to 600 amps. At about 300 amps. (and 80 volts) the silicon begins to volatilize from the ore and care must be taken at this point not to overheat the mixture. The boiling of the zirconium may be detected through the observation orifice in the furnace by the appearance of an orange colored mist. By this time the amperage will be in the neighborhood of 600 and the temperature will be about 3800° F. Normally this should take about twenty minutes. If purer zirconium for use in non-ferrous work is desired, the same procedure is followed with the exceptions that the iron is eliminated, the current is gradually increased to 900° F., and the pouring temperature will be from 4000° to 5000° F.

The columbium is obtained preferably from the mineral columbite (niobite) which is a combined columbium and tantalum ore. In reducing these elements, substantially the same procedure is followed as with the zirconium except an equal amount of iron is used and the mixture is combined with cryolite which is used in the amount of 40% to 50%. This melt may also be made without the iron in the case of non-ferrous alloys.

In the mineral or ore the columbium and tantalum are very closely associated but they are seldom found in exactly the same ratios. Two specimen analyses of the ore are as follows:

(I)

|  | Per cent |
|---|---|
| Columbium oxide | 64.5 |
| Tantalum oxide | 12.3 |
| Titanium oxide | 0.8 |

This ore is satisfactory for use in the production of practically all of the commercial and engineering alloys produced in accordance with the invention, whether ferrous or non-ferrous.

(II)

|  | Per cent |
|---|---|
| Columbium oxide | 41.8 |
| Tantalum oxide | 32.9 |
| Titanium oxide | 3.4 |

Although this ore may be used in production of the ferrous alloys, it is more suitable for the non-ferrous, and for the production of surgical and dental instruments, jewelry, laboratory ware, and the like.

The use of the tantalum in the making of these alloys has certain advantages over the use of tungsten in many cases since it produces a more stable and less volatile combination and has a greater effect in increasing the strength and hardness of steel than tungsten. The effects of the tantalum are, however, not as great in this respect as columbium which is the main element obtained from the mineral or ore. Since both the columbium and tantalum are of advantage in this connection, it is not necessary to separate them and the combined elements as obtained from the reduction bath or melt may be used directly in the main melt in producing the alloy. The titanium which is present is more or less in the nature of a by-product and some of it becomes lost during the melt, but in any case it is not disadvantageous in the quantities in which it appears.

As an alternative process to be used in cases where carbon is desired in the final alloy, or at least in cases where the presence of carbon would not be deleterious, the reduction melt may be pursued by employing carbon flour as the reducing agent instead of the cryolite. The carbon may be reduced or eliminated by the addition of iron oxide at intervals during the process, in order to drive the excess carbon into the slag. Otherwise the reduced material may be broken up or crushed and treated with hydrochloric acid. Then the resulting solution which contains the carbon may be syphoned off. This last described process, however, is not desirable in most cases.

It is also understood that in cases where extreme hardness is necessary titanium nitride or titanium boro-carbide may be used. Also in some cases, if readily available, tungsten could be used to replace a portion of the columbium, but this is not the preferred way of preparing the alloys for most purposes.

Now, in order to prepare the ultimate alloy, either in the form of the tool, bar, or stock already described or according to the other various formulas which have been set forth, a quantity of low carbon steel is charged into the furnace in the requisite proportions to attain the desired formula, then the zirconium and the combined columbium and tantalum resulting from the premelts are added. The furnace is closed and the arcs lowered and the current started. The time of the heating ranges from twenty-five to forty-five minutes and the maximum temperature will range from 3600° to 4700° F. The amperage of the current will run from 250 to 1200. Suitable variations in these figures will be made depending upon the specific alloy being produced. When tungsten is used in the final melt it is also charged in at the start along with the iron, zirconium and columbium except that this element is introduced in the form of scheelite or wolframite, the former being preferable. Since these minerals also contain iron, this must be allowed for in the quantity of steel used in the melt. Other impurities contained in the ore are thrown into the slag during the operation.

When titanium nitride is used, it is added approximately ten minutes before the completion of the final melt. If titanium boro-carbide is used, and this is preferred over the nitride, it may be charged into the furnace with the original ingredients. The titanium nitride may be obtained by the reduction of the titanic acid and the titanium boro-carbide may be obtained by reducing rutile with carbon and amorphous boron. However, these ingredients may be prepared in any other suitable way.

The molds may be of a permanent nature whether made from the special refractory materials as already described herein, cast of high carbon silicon, or prepared as a case-hardened type of steel mold. If the refractory type are used, they are preferably made interlocking so that the drag and the cope are locked after the pattern is installed. All molds are pre-heated to temperatures ranging from 800° to 1200° F. prior to pouring the alloy.

When the alloy is poured the molds are placed in the aging oven or pit and allowed to cool gradually down to room temperature.

In the case of small dental drills and burrs, the alloy is cast into permanent case-hardened steel molds using the 75 C alloy. These products and also drills, saws, threaders, files, and other tools of this nature are hardened by laying them in an electric oven, the bottom of which is covered with carbon sufficiently deep to cover the articles placed thereon. In this hardening process the articles are kept in this carbon bath from three to twenty-four hours at temperatures ranging from 250° to 600° F. depending on the size of the tools and the hardness desired. For example, small drills of ¼" diameter should be treated from one to one and a half hours and drills of approximately 1½" diameter from ten to twelve hours. This process eliminates the oil tempering and other heat treating processes formerly employed in connection with alloy steels used for similar purposes.

Having thus described the invention, what is claimed as new and desired to be secured by Letters Patent is:

1. A hard, high-tensile strength alloy suitable for high speed cutting tools or the like, which comprises 10% to 40% zirconium, 3% to 20% columbium, 1% to 8% tantalum, 3% to 15% titanium, and the balance iron.

2. A high speed cutting tool alloy which comprises from 30% to 35% zirconium, from 14.5% to 17% columbium and tantalum combined, up to 15% titanium, and the balance iron.

3. A high speed cutting tool alloy which comprises about 30% zirconium, about 15% columbium and tantalum combined, about 7% titanium, and the balance iron.

4. A high speed cutting tool alloy which comprises about 30% zirconium, about 12% columbium, about 2.5% tantalum, about 7.5% titanium, and the balance iron.

5. An alloy suitable for sharpened cutting blades which comprises from 20% to 25% zirconium, from 8% to 3% columbium, from 1.5% to 0.5% tantalum, up to 3% titanium, and the balance iron.

6. An alloy suitable for surgical and dental instruments which comprises about 40% zirconium, from 14% to 20% columbium, from 4% to 5% tantalum, from 7% to 10% titanium, and the balance iron.

7. An alloy suitable for surgical and dental instruments which comprises about 20% zirconium, about 10% columbium, about 2% tantalum, about 7% titanium, and the balance iron.

8. A hard, high-tensile strength alloy suitable for high speed cutting tools or the like, which comprises 5% to 40% zirconium, 1% to 20% columbium, 1% to 8% tantalum, 3% to 15% titanium, and the balance iron.

CHARLES J. SCHAFER.